Patented Jan. 3, 1950

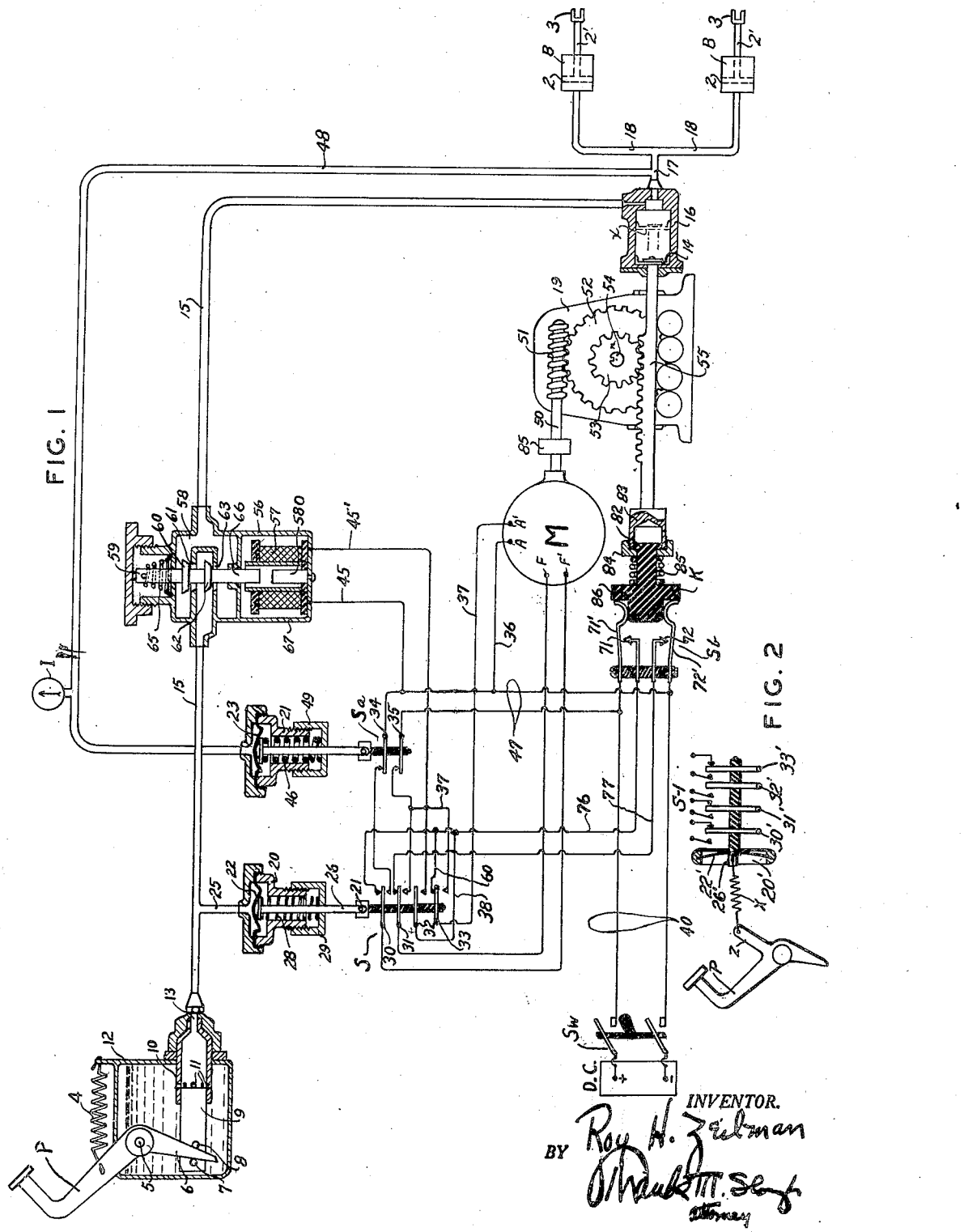

2,493,377

UNITED STATES PATENT OFFICE 2,493,377

AUTOMOTIVE HYDRAULIC BRAKING SYSTEM

Roy H. Zeilman, Lorain, Ohio, assignor to The Thew Shovel Company, Lorain, Ohio, a corporation of Ohio Application July 24, 1945, Serial No. 606,793

8 Claims. (Cl. 60—54.5)

The present invention relates to an improved braking system and appartus and the method of operating the same, and more particularly relates to the employment of electrical power means therefor.

In large heavy vehicles employed for cranes, shovels and the like, the braking of the wheels or endless tracks requires more power than can be applied by the personal braking effort of an operator, and therefore, such expedients as air brake systems have been employed for heavy vehicles.

In the prior use of air brakes, a source of brake energizing pressure is provided by a source of air maintained under high pressure supplied by a motor driven pump of any suitable type, it being necessary in such a system to provide a motor-driven air compressor and other apparatus ancillary thereto including a pressed air tank to the equipment normally carried by the automotive vehicle; in such air brake systems, the operator directs a flow of highly compressed air to suitable fluid pressure responsive, brake operating devices by the actuation of air valves which obviously may be operated by hand or foot power.

Hydraulic braking systems have been found more practical and reliable for passenger automobiles, where most commonly, the operator, by actuation of a brake pedal or hand lever, communicates foot or hand power to a confined body of hydraulic fluid such as oil, and by virtue of conduits leading from such confined hydraulic fluid to brake operating fluid responsive diaphragms or pistons, the power so created is transmitted to the vehicle brakes.

However, since hand or foot power is insufficient for the purpose of adequately braking heavy vehicles of the aforesaid class, it is an object of my present invention to provide electrical power means for supplementing the effort of the vehicle operator, whereby a greatly increased hydraulically transmitted braking effort is communicated to the vehicle wheels, which, at all times, is under the control of the usual personally operable braking apparatus.

Although it has previously been proposed to apply a compressed air pressure system for actuating the brakes of an automotive vehicle to a hydraulic system of lower power which is personally controlled by the operator of the vehicle, the application of the compressed air equipment involves a clearly increased expense in the vehicle carried equipment, said equipment also taking up considerable space on the vehicle which can more advantageously be employed for other utilitarian purposes.

All commercial types of automotive vehicles now commonly are provided with a storage battery which is standard equipment and I therefore utilize current from said storage battery for energization of an electric motor which, in turn, is adapted to actuate and/or retract a hydraulic compressor of the type employing a reciprocable piston which is adapted to operate under the control of a foot power compressor for hydraulic fluid, and when so operated is adapted to greatly increase the hydraulic pressure of fluid applied to the hydraulic pressure responsive braking motors.

An object of the present invention is to provide a heavy vehicle with an electro-hydraulic power braking apparatus and system which may be supplemental to, operable under the control of, and be operated responsive to the operation of a personally actuated liquid pressure braking system which is, in no way, nor to any degree disabled to apply a personally created braking effort to the vehicle wheels, should the auxiliary controlled power braking apparatus become inoperative, or be out of operating conditions.

Another object of my invention is to provide an improved hydraulic braking system for heavier vehicles than can adequately be braked by the personal effort of the operator, which is operable through the instrumentality of an electric motor energizable from a vehicle carried electrical storage battery and operated under the control of the same brake pedal or other lever which, if the motor means is inoperative, is operative to apply a personally created braking effort to the wheels of the vehicle.

Other objects of my invention and the invention itself will be obvious to those skilled in the art by reference to the following specification of a preferred embodiment of my invention and to the accompanying drawing illustrating the said embodiment.

Fig. 1 is a diagrammatic view of an embodiment of my invention;

Fig. 2 shows, diagrammatically, an alternate arrangement wherein a starting switch, ordinarily hydraulically operated, may be operated by the provision of a mechanical link between the brake pedal and the switch.

The drawing is a diagrammatic view of merely one embodiment of the invention, the various parts indicated not being to a uniform scale, the proper sizes of the various operative parts for any vehicle being susceptible of ascertainment according to well known engineering principles, when the number of wheels to be braked and the weight of the vehicle is known.

Referring now to the drawing, at B I show two of any desired number of fluid brake cylinders, according to the number of vehicle wheels to be braked.

Each of said cylinders, as is well known, comprises a movable element, such as a piston 2 and attached piston rod 2', the latter adapted for attachment at 3 to the operative lever (not shown) of a friction brake mechanism for a vehicle wheel, whereby when the piston rod is further extended from the cylinder, said lever applies the friction brake to a degree dependent upon the outward thrust of such rod.

At P, is shown a vehicle brake pedal of any well known type, normally maintained in retracted position, as shown, by a spring 4, being journalled upon a cross shaft 5.

The pedal P provides by an extension 6, an operating lever, flexibly interlocked between projections 7 of a piston rod extension 8 of a piston 9, which is telescoped for reciprocation within a cylinder 10 to provide a liquid compressor. The spring 4, through the pedal lever 6, normally maintains the piston 9 in the inoperative position indicated. At 11, I show the perforations of walls of the cylinder 10, which provide inlet ports for the cylinder, said ports 11 being normally in communication with a supply of liquid, such as oil, maintained in the box 12, which is relatively more elevated than any other part of the fluid system, whereby the cylinder and the fluid system is normally maintained full of oil in one of many well known ways. Any well known expedients, not here shown, are employed whereby the presence of air in the fluid system is avoided, and to ensure that the system is maintained filled with liquid.

A conduit 15 having a valve housing 58 interposed therein extends from the discharge port 13 of the cylinder 10 to the cylinders B, via the cylinder 16, conduit 17, and like branched conduits 18.

The pedal P, when personally depressed, is, therefore, initially adapted to move the piston 9 inwardly of the cylinder 10, first to close the inlet ports 11, then to force the oil thus trapped through the outlet port 13, into the conduit 15, which, as previously stated, leads to the brake cylinders B.

The liquid forced from the pressure cylinder 10, into the conduit 15, thus causes displacement of liquid in the conduit means leading to said brake cylinders and so increases the pressure of liquid exerted against the brake pistons 2 as to cause them to move the piston rods 2' outwardly to a sufficient degree to initiate braking effort upon the brake mechanisms, not shown, which are respectively associated with the vehicle wheels, equipped with such mechanisms.

The personally effected pressure of the vehicle operator upon the brake pedal P therefore is effective to accomplish a substantial degree of braking effort upon the vehicle wheels, independently of any operation of the piston 14 of the cylinder 16, which cylinder, not shown to scale, is much larger than the cylinder 10; the length of the piston stroke of the piston 14 is preferably and assumed to be greater than that of the piston 9. The piston 14 is adapted by the apparatus illustrated in the drawing to be operated by an electric motor M through reduction gearing comprising the worm 51, gear 52, and rack pinion 53, said gearing being preferably flexibly driven by any suitable form of flexible coupling, generally indicated at 85, which is provided to lessen the starting shock upon said gearing, which may be in widely variant forms, only one of which is shown in the drawings, the principle being generally indicated at 19; however, in the event of failure for whatsoever cause of the motor M to operate the piston 14, the physical effort of the vehicle operator exerted upon the pedal P is thus apportioned among the brake mechanisms served by the cylinders B, and which in number will preferably be equal to the number of braked wheels with which the vehicle is provided.

By virtue of the above motor-operated power compressor, I have provided in the system of my invention, an auxiliary source of highly increased hydraulic pressure, for increasing the braking effort, comprising said motor and gearing. The motor M may preferably be of the direct current shunt wound type, whereby after the piston has been initially advanced by said motor to apply the brakes, reversal of the energizing current supplied to its field winding is effective to cause the motor to rotate the motor shaft 50 in the alternate direction of rotation to retract the piston 14.

Through the instrumentality of the intermeshed worm pinion 51 and intermeshed worm gear 52 together with the rack driving pinion 53, which with the worm gear 52 is keyed onto the shaft 54, the rack 55, which is intermeshed with said rack pinion 53, may be thrust in either longitudinal direction by rotation in the desired direction of the reversible motor shaft 50.

At 56, I show an electromagnetically operated valve mechanism comprising a lowermost compartment containing a solenoid electromagnet 57 and the upper part comprising a valve housing 58. A valve stem 59 provided with a pair of valves 60 and 62 is so disposed in the casing 56 as to be downwardly reciprocable to close the valve ports 61 and 63 against the power of a spring 65 which exerts pressure to press the valve stem 59 toward its illustrated uppermost valve opening position. To the lower end of the valve stem 59, I preferably provide an electromagnet armature 66, rigidly affixed thereto, and adapted upon energization of the electromagnet 58, to move said valve stem downwardly to simultaneously close said valve ports.

The duplicated valves are so arranged as to be oppositely affected by hydraulic pressures at either side, whereby such hydraulic pressure does not tend to move the valves which are differentially balanced with reference to hydraulic pressure.

The electromagnetic circuit for the armature 66 preferably comprises said armature, the walls 67 of the electromagnet compartment 56, and a core element 580 which extends partially upwardly through the bore of the electromagnet in the axial direction of the armature 66 which is normally longitudinally spaced from the end of the core element 58, and magnetically attracted thereto to simultaneously operate the valves when the magnet is energized.

For the purposes of suitably controlling the energization of the motor M, I provide a pair of hydraulically operable switches S and Sa, which are, respectively, adapted to be operated by the hydraulic pressure device indicated at 20 and by the switch key K which is carried by the piston operating rack 55. The device 20 is preferably provided with a switch operating "snap-action" element which is preferably supplied by the diaphragm 22 of the well known reversible buckled type, disclosed in somewhat similar form in the prior patent to Levy, No. 1,781,287, dated November 11, 1930.

However, any other known fluid operated switch mechanism which is adaptable to operate the contact sets with a "snap-action" responsive to the application and cessation of fluid pressure may be employed.

The switch mechanism Sb comprises two pairs of switch contacts 71 and 72, the associated contacts of which are normally broken by normal interposition of the key 86 which is carried by the rack 55 between the outermost switch contact springs 71' and 72'. These pairs of contacts are adapted to be closed upon movement of the rack 55 in such direction as to thrust piston 14 inwardly of the cylinder 16; said contacts being subsequently adapted to be reopened with a "snap action" upon return of said rack to the normal position.

The "snap action" breaking of the switch contacts is achieved by virtue of the spring 85 which is compressed when the key K engages the curved ends of the contact springs 71' and 72' which resist further movement of the key sufficiently to effect telescoping of the end 82 of the key into the slide-way of the element 83 carried by the end of the rack 55, until the pressure of the thereby compressed spring is sufficient to snap the end of the key K between said curved ends of said control springs.

While the actuating means for both of the switch means S and Sa are preferably of the same type, each comprising a fluid pressure device comprising reversibly buckled spring diaphragms 22 and 23, respectively, exposed to pressure of liquid in the conduits 15 and 48, respectively, and each biased toward normal position by the restoring springs 28 and 46, respectively, the spring 46 for the diaphragm 23 is, however, a much heavier spring than the spring 28 which is relatively light and the diaphragm 23 is of thinner spring metal, whereby the actuating diaphragm 22 for the switch means Sa is operated only upon communication of a much greater value of liquid pressure communicated to the upper side of the diaphragm 23. In each case, and more importantly for the switch Sa, the opposing pressure effect of said springs upon the respective diaphragms is susceptible of predetermined adjustment by suitably threading the caps 29 and 49 on the respective diaphragm housings.

The pressure device 20 is therefore susceptible to operation very shortly after the piston 9 has passed the ports 11 but until the motor has caused withdrawal of the plug K from between the springs 71¹ and 72¹, continued movement of the brake pedal P will add to the pressure of liquid in the lines 15, 17 and 18, particularly when the pedal P is moved with more than ordinary power and speed; but usually the power actuated piston 14 will be substituted for the piston 9 as the source of hydraulic pressure for operating the brakes before the piston 9 has built up a substantial amount of pressure in said lines.

The diaphragms 22 and 23 are each so formed that whenever sufficient fluid pressure is applied to the convex surface of the diaphragm, downward movement of said central portion occurs to cause the central portion of the diaphragm to be rapidly reversely buckled, by so-called "snap-action," whereupon its upper side is concave and its lower side convex, and such "snap-action" movement in either direction is communicated to the switch blades of the respective associated switch means. The value of fluid pressure which will be effective to operate the switch Sa may be indicated by the indicator I.

As previously stated herein, the illustrated "snap-action" diaphragms 22 and 23 for the switches S and Sa, and the "snap-action" spring and key mechanism for the switch Sb are merely presented as being symbolical representations of certain of many forms of snap action devices which can be advantageously employed to ensure that the illustrated contact pairs which conduct relatively heavy direct current flows, will be broken with sufficient rapid movement of the movable elements of the switches, as to prevent the drawing out of an arc which otherwise might be continuous and destructive of the contacts.

However, I am aware that electrical switches wherein contacts are broken with a snap action are well known in many forms and with many different kinds of snap action instrumentalities associated therewith, and I therefore contemplate the use of any suitable instrumentality for any of the switches disclosed in the present specification and drawings.

In order to minimize the arcing at switch contacts, I am aware of the well known practices of suppressing the electrical inductive discharges emanating from the windings of motors, electromagnet windings and the like, consisting of the bridging of such windings by condensers, resistors, or combinations thereof, as well known in the electrical arts; and although illustration thereof is here omitted, I therefore contemplate suitable use of such devices for the electromagnet winding 57 and the motor windings, but, in any case, I deem it important that breaking of switch contacts carrying heavy direct currents advisedly should be achieved with the movable element thereof moving at a high rate of speed, and this is suitably accomplished by provision of "snap-action" instrumentalities.

Whereas I have illustrated the hydraulic actuator 20 for actuating the switch S, it will be understood that actually the pedal P is the primary actuating means for said switch and that the piston 9, the column of liquid in the cylinder 10, and conduit means 15—25, and the diaphragm carried rod 26, are merely motion transmission means to transmit switch operating motion from the pedal P to said switch. The structure for operating the switch S could, therefore, be simplified by employing a suitable mechanical movement element 70, as shown in Fig. 2, such as the spring X, interconnecting any suitable element of the pedal, such as an arm Z, with the element 26¹ of the switch S¹, there being incorporated in such an arrangement a suitable annular holder 20¹ for a resilient dished diaphragm 22¹, the switch blades thus being assembled together but insulated from each other and the assembly is connected to the central portion of the disc. It will be obvious that movement of the pedal P will exert tensile stress upon the element 26¹ which is joined to the central portion of the disc, and by a snap action of the disc will remove the switch blades 30¹, 31¹, 32¹ and 33¹ in substantially the same manner as the corresponding switch blades at S in Fig. 1, to directly operate said switch from said pedal, by interlinking said pedal P and said rod 26¹; the diaphragm 23 or any similar snap action device 23 merely serves, in any case, to effect snap-action breaking of the switch contacts.

The hydraulic device 20 here disclosed permits variation of preferred placement of the switch S, to accommodate my preference that such switch be positioned near the motor M, to simplify my preference to build the motor, power compressor, and controlling means as a more compact unit, and which purpose is well served by use of the disclosed device 20.

The booster brake controlling system is preliminarily conditioned for operation by first operating the manually operable switch Sw whereby current from the storage battery carried by the vehicle is communicated to the conductors 40, and said manual switch is maintained in operated position throughout every period of vehicular travel, requiring use of the power-actuated braking mechanism, herein disclosed.

Other auxiliary locking or wheel braking means, not shown, are employed to hold the vehicle stationary during periods when vehicular travel is not desired.

*Compression motor starting operation*

The switch S being operated, as previously described, closure of the normally open contacts associated with the switch blades 30 to 33 inclusive is effected, thereby closing energizing circuits for the compressor motor, as follows:

Battery current from the source D. C. is concurrently supplied to the motor armature terminals, first, by the conductor 36 which connects the negative conductor 40 to the armature terminal A, and second by the normally open but now closed contacts associated with the blade 33 of switch S, which extend a circuit from the positive terminal of battery to the armature terminal A', through positive conductors 40' and 47', the lowermost normally closed contacts associated with blade 35 of the switch Sa, the conductor 37 leading therefrom to said now closed contacts for the blade 33, and this circuit including the conductor 37 leading from said blade 33 to the said armature terminal A'.

The motor is now operated to rotate its shaft 50, the worm 51 and reducing gearing 52 and 53, to drive the rack 55 in the forward direction required to advance the piston 14 to compress the liquid contained in the cylinder 16, thereby to apply the very high pressure of said liquid through conduit ducts 18 to the brake units B to apply the wheel brakes. associated therewith.

From the battery, D. C. current flows through the conductors 40' and 47' through the normally made pair of contacts associated with the switch blades leading to the conductors 34 and 35 of the switch Sa, through the pair of conductors leading therefrom to the normally open but now closed contact pairs associated with switch blades 30 and 31 of the switch S, and thence to the motor field winding, not shown, but whose terminals are indicated at F and F'. The positive pole of the battery D. C. is thereby connected to the terminal F, and the negative pole to the terminal F'.

Currents thus concurrently flow both in the motor field and armature in such related directions of flow that the motor shaft 50 is rotated in such a direction as to cause the worm 51 to drive the gears 52 and 53 counter-clockwise, whereby the rack 55 together with the piston 14, is thrust forwardly to cause said piston to expel liquid from the cylinder 16.

Initial movement of the rack 55 effects closure of the contact pairs 71 and 72 of the switch Sb and the switch operating parts are so proportioned that said contacts are closed before the piston 14 has been moved sufficiently to so greatly increase the pressure of liquid in the cylinder 16, and resultantly in the conduit 15, as to overpower the previously applied personal effort exerted upon the piston 9 by the pedal P.

An undesirable amount of such back pressure reacting upon the pedal P is avoided by the closing of the valve ports 61 and 63 which are interposed in the conduit line 15, said ports being closed by the electromagnetically movable valves 60 and 62 which, when the electromagnet 55 is energized, are moved downwardly to close said ports, by the effect of the magnetically induced downward movement of the armature 66, attached to the lower end of the valve stem 59.

This electromagnet 57 is energized by closure of the contacts 71 of the switch Sb, and by precedent closure of the normally open contacts of the switch S which are associated with the switch blade 32 thereof. The energizing circuit comprises both said pairs of normally open contacts relatively serially related and with circuit conductors comprising the conductors 76, 38, 45, and 45'.

The valve ports 61 and 63 are closed and maintained closed until subsequent retraction of the rack 55 nearly to normal position, as a result of the continued magnetic pull exercised on the movable armature 66 of the electro-magnet which causes its lower end to approach but preferably not to make engagement with the upper end of the stationary core pole 58.

Prior to full engagement of said armature with said pole, the valves 60 and 62 are firmly seated and further movement of the armature 66 is prevented.

Immediately following closure of the valve ports 61 and 63, the motor M continues to advance the piston 55, the contents of the cylinder being progressively expelled into the brake cylinder conduits 17 and 18, and the motor power and the size of the piston and the length of its stroke being so proportional that the vehicle brakes are applied with much greater pressure than previously personally initiated merely by operation of the pedal P; continued depression of the pedal P to maintain the switch S operated, as described, will soon cause the brake mechanisms to be as fully applied as is desirable, by application of fluid pressure resulting from forward movement of the piston 14, applied to the pistons 2 of brake cylinders B.

The high degree of liquid pressure thus communicated to the conduit 17 is also concurrently communicated by the duct 48, to the preferably upper normally convex side of the diaphragm 23 provided for operating the electric switch Sa, and until a predetermined maximum fluid pressure is achieved, whose value may readily be ascertained from the fluid pressure indicator I, which communicates with the conduit 48 and is preferably located upon the operator's instrument panel in the driving compartment of the vehicle.

The adjustable cap 49 having been suitably preadjusted to so compress the spring 46, that such predetermined maximum pressure will be sufficient to overcome the resistance offered by said spring pressed diaphragm whereby the liquid pressure at said maximum value will effect reversal of the direction of buckling of said diaphragm whereby said diaphragm will operate the switch Sa, to snap the blades of its contact sets 34 and 35 to open circuit position.

Opening of the contact pairs 34 and 35, while the switch S is operated to maintain the contact pairs 30 and 31 closed, interrupts the energizing armature and field circuits of the motor M and discontinues the hydraulic compression forward movement of the rack 55 and, with motion of the piston 14 arrested at some such indicated position as $x$, said maximum pressure is continuously applied to the brake units B, until such time as the operator, by releasing the pressure upon the pedal P, restores the switch S to normal position.

Thus, excessive braking pressure otherwise achieved by forward braking movement of the piston 14 is avoided, since operation of the switch Sa causes its switch blades to break the energizing armature and field motor circuits, previously described, said circuits both being interrupted by said breaking of the contacts 34 and 35, which are serially included in both said motor energizing circuits, at this time.

*Restoring Operation*

The operator, at any time during energization of the motor M, may interrupt the forward movement of the piston 14 by merely releasing the foot pressure previously exerted upon the pedal P. Such release of the pedal P, whether effected during operation of the motor M, to advance the piston or after the motor stops due to aforesaid operation of the switch Sa as a result of maximum liquid pressure being achieved, is effective to effect reversed operation of the motor to restore the rack 55, piston 14, and switch K to normal.

Such motor reversal is effected by reversing the polarity of battery current respectively applied to the motor field winding terminals F and F' and by concurrently maintaining energization of the motor armature by current flowing in the same direction therethrough as before.

Release of the pedal P causes the switch S to be restored to normal, since relief of personally applied liquid pressure above the diaphragm 22, enables the spring 28 to restore the diaphragm to inverted dished form.

The motor armature circuit then is re-closed, its terminal A remaining connected through conductor 36, to the negative terminal of the battery D. C., and its terminal A' through conductor 37, the reclosed normal contacts of blade set 33 of the switch S, conductors 60 and 76, and the off-normal, now closed contact pair 72 of the switch Sb.

The motor field winding is concurrently energized, but by reversed flow of current by reclosing of the normal contacts including the switch blades 30 and 31, whereby current from the battery is reversely supplied through off-normal closed contacts 71 and 72 of the switch Sb, to said blades 30 and 31 and the conductors leading from said blades to the motor field winding terminals F and F', communicate such reversed current to said field winding.

The motor, thus reversely operated continues to retract the piston until the compression spring 85 suddenly thrusts the plug end of the key K between the blades of the switch Sb whereby said motor field and motor armature circuits are broken by the now opened contacts 71 and 72.

Concurrently breaking of the contacts of the blade set 32 which have maintained current flow through the valve operating electromagnet 57, de-energizes said magnet, and the restoring spring 65 restores the magnet armature and the valves 60 and 62 to normal valve-open position.

During retraction of the rack 55, consequent to restoration of the switch S, the restoring movement of the piston 14 of the compression cylinder 16 reduces the hydraulic pressure exerted through the conduit 48 to the upper side of the diaphragm 23 whereupon the switch Sa is restored to normal when said hydraulic pressure reaches a somewhat lower valve than the above described predetermined maximum value which is required to initially operate the diaphragm.

Restoration of the switch Sa, therefore occurs at a time considerably in advance of the time when the rack 55 is completely restored to normal position.

The first said cylinder is of relatively small readiness for operation, as before.

I have previously stated that the various instrumentalities illustrated and described are not illustrated in any uniform scale in the drawing, the size of the various parts being largely dictated by the relative difficulties of illustrating some of the parts in the small size, in other parts are illustrated with respect to the diametrical sizes of the cylinder 10 and piston 9 as compared with the cylinder 16 and piston 14.

The first said cylinder is of relatively small diameter, that the pressure of the operator's foot on the pedal P may only be as great as a motor vehicle driver commonly is accustomed to exert upon the brake pedals of automobiles and may be of the order of 50 or 60 lbs., and the piston 9 and the inner walls of the cylinder 10 may therefore be of the order of 1" in diameter.

On the other hand, the piston 14 being motor-operated through reduction gearing, the cylinder 16 may be 6 to 8" or more in diameter depending upon the power of the motor M and the number of sizes of brake cylinders B to which said pressure cylinder 16 supplies hydraulic pressure.

The speed and length of the rack is preferably such as to achieve the predetermined maximum high braking hydraulic pressure in a matter of a second or so.

The switch K and the parts therefor including the key $k$, spring 85, and element 83 are shown in relative large scale, but, in practice, would be very small and short as compared to the motor operated rack 55 and operating means therefor.

All of the above values are susceptible to considerable variation depending upon the weight and possible speed of the vehicle and the nature of the braking devices comprising the cylinders B or their hydraulic equivalents.

Having described my invention comprising an improved system and method for operating vehicular brakes for motor vehicles, I am aware that numerous and extensive departures may be made from the system, method and apparatus illustrated and/or described, without however departing from the principle and spirit of my invention.

I claim:

1. The combination with an automotive hydraulic braking system comprising a personally operable controlling brake pedal, a liquid container, a control compressor comprising a cylinder and piston, a source of liquid and means for normally disposing said source in communication with the interior of the cylinder, said means comprising a port in a wall thereof, said pedal operative to actuate said piston to close said port and upon retraction of the pedal to restore said piston and open the port, a plurality of hydraulic pressure responsive expansible hydraulic braking motors, a power compressor comprising a reciprocable piston and a cylinder therefor, intercommunicating conduit means comprising conduits interconnecting the cylinders of both said compressors and all said motors, pressure transmission liquid filling the space within said cylinders, motors, and conduits, a storage battery, an electric motor, and reduction of gearing adapted to communicate power from said motor to move said power compressor piston, said motor having a pair of respectively field and armature windings, a plurality of electrical switches, a plurality of circuit conductors extending between said battery, contacts of said switches and said motor windings, means for transmitting motion of said pedal, when actuated and retracted, to respectively operate and restore a first of said switches, a liquid pressure responsive device in fluid communication with said power compressor cylinder adapted to operate a second of said switches under conditions of pre-determined high pressure exerted on the transmission liquid in response to a compressive movement of the piston, a third switch adapted to be respectively actuated and restored responsive to respectively off-normal and normal restored positioning of said power compressor piston, said first switch, when actuated, adapted to complete an electrical circuit from said battery, through certain of said conductors, to said motor windings so as to cause said motor to drive said power compressor piston through said gearing in the liquid compressive direction, said second switch adapted to be operated by said device when said piston has moved sufficiently to exert said pre-determined degree of high pressure upon said liquid, and said second switch when operated adapted to interrupt the previously completed said circuit for operating the motor, and said first switch when restored by the effect of retracting movement of said pedal adapted to complete a modified circuit from said battery through normal contacts of said first switch and off-normal contacts of said third switch to said windings in such manner that current will flow through said windings with the direction of flow through one of them being relatively reversed, whereby the motor will be reversely driven to retract said power piston to its normal inoperative position, and said means for transmitting motion from said pedal to said first switch comprising a fluid pressure motor for actuating the switch and a liquid filled conduit interconnecting said motor and said control compressor cylinder.

2. The combination with an automotive hydraulic braking system comprising a personally operable controlling brake pedal, a liquid container, a valve device comprising a cylinder and piston, a source of liquid and means for normally disposing said source in communication with the interior of the cylinder, said means comprising a port in a wall thereof, said pedal operative to actuate said piston to close said port and upon retraction of the pedal to restore said piston and open the port, a plurality of hydraulic pressure responsive expansible hydraulic braking motors, a power compressor comprising a reciprocable piston and a cylinder therefor, intercommunicating conduit means comprising conduits interconnecting both said cylinders and all said motors, pressure transmission liquid filling the space within said cylinders, motors, and conduits, a storage battery, an electric motor, and reduction gearing adapted to communicate power from said motor to move said power compressor piston, said motor having a pair of respectively field and armature windings, a plurality of electrical switches, a plurality of circuit conductors extending between said battery, contacts of said switches and said motor windings, means for transmitting motion of said pedal, when actuated and retracted, to respectively operate and restore a first of said switches, a liquid pressure responsive device in fluid communication with said power compressor cylinder adapted to operate a second of said switches under conditions of predetermined high pressure exerted on the transmission liquid in response to a compressive movement of the piston, a third switch adapted to be respectively actuated and restored responsive to respectively off-normal and normal restored positioning of said power compressor piston, said first switch, when actuated, adapted to complete an electrical circuit from said battery, through certain of said conductors, to said motor windings so as to cause said motor to drive said power compressor piston through said gearing in the liquid compressive direction, said second switch adapted to be operated by said device when said piston has moved sufficiently to exert said predetermined degree of high pressure upon said liquid, and said second switch when operated adapted to interrupt the previously completed said circuit for operating the motor, and said first switch when restored by the effect of retracting movement of said pedal adapted to complete a modified circuit from said battery through normal contacts of said first switch and off-normal contacts of said third switch to said windings in such manner that current will flow through said windings with the direction of flow through one of them being relatively reversed, whereby the motor will be reversely driven to retract said power piston to its normal inoperative position.

3. The hydraulic braking system substantially as set forth in claim 1, characterized by the provision of a valve disposed in a conduit of said conduit means which interconnects the cylinder of the control compressor and the hydraulic actuating motor for said first switch with the said power compressor cylinder and the hydraulic braking motors, said valve being operative to close said conduit, and of an actuator for said valve and means for effecting operation of said actuator, said latter means primarily comprising said pedal and an element of the motor operated actuating means for said power compressor piston, whereby said valve actuator is adapted to be operated responsive to a braking movement of said pedal when said power compressor piston has moved from its normal inoperative position toward its liquid compressing position.

4. The hydraulic braking system substantially as set forth in claim 1, characterized by the provision of a valve disposed in a conduit of said conduit means which interconnects the cylinder of the control compressor and the hydraulic actuating motor for said first switch with the said power compressor cylinder and the hydraulic braking motors, said valve being operative to close said conduit, and of an electro-magnet for actuating said valve and means for effecting operation of said electro-magnet, said latter means comprising normally open contacts of said first switch and normally open contacts of said third switch, whereby said electro-magnet is adapted to be energized to close said valve responsive to closure of normally open contacts of said first switch and closure of normally open said third switch.

5. The combination with an automotive hydraulic braking system comprising a controlling piston operated liquid compressor, a pedal for operating said compressor, a plurality of hydraulic pressure responsive expansible hydraulic braking motors, intercommunicating conduit means comprising conduits interconnecting said compressor and said motors, pressure transmission liquid filling the space within said compressors, said conduits, and the expansible elements of said motors, of a power compressor having a hydraulic liquid filled compressor chamber in communication with said conduit means and said motors and a reciprocable compressing element affording one movable wall of said chamber, a valve interposed in said conduit means between said control compressor and the said motors and power compressor, a storage battery, an electric motor and transmission means adapted to communicate power from said motor to reciprocate said element, said motor having a pair of energizing windings, electrical current conducting means interposed between said battery and said electric motor windings comprising electrical circuit conductors and a plurality of electric switches, one of said switches adapted for actuation and retraction responsive to actuating and retracting movements of said pedal, a hydraulic liquid pressure responsive device and a second of said switches adapted for operation by said device upon communication of liquid at a predetermined high pressure to said device, said device having an actuating liquid containing chamber in communication with the body of liquid communicated to said motors, means operable responsive to off normal and restoring movements of said element adapted to respectively operate and restore a third said switch, said first switch when actuated adapted to communicate battery current to said motor windings to cause said motor to be operated to communicate compressing movement to said element, said first switch when restored and said third switch while actuated cooperatively adapted to communicate battery current to said windings with the direction of current reversed through one of said windings and said third switch adapted when restored to normal position to interrupt the flow of current to said motor windings.

6. A hydraulic booster system for a pedal operated vehicular hydraulic braking system comprising in combination with the actuating pedal, braking hydraulic motors, a control compressor and an operating control pedal therefor, a power compressor comprising a liquid compressing reciprocable movable element, a reversible direct current motor for thrusting and retracting said element from and to a normal position, a storage battery, an electric motor, a hydraulic device operable responsive to hydraulic pressure applied thereto when of a predetermined maximum value, said device in fluid communication with said power compressor, conduits interconnecting the exhaust ends of said compressors, and interconnecting said motors and said compressors, means for directing current from said battery to said electric motor first through the field and armature windings to drive the motor in a first direction and thereafter to reversely drive said motor which directing means comprises a first electric switch actuable and restorable responsive to actuating and restoring movements of said pedal, a second electric switch actuatable and restorable responsive to off-normal and restored positioning of said compressor element, and a third electric switch actuatable and restorable responsive to actuation and restoration of said device, and electrical circuit conductors interconnecting said battery to said electric motor through varying contacts of said switches, mechanical transmission means for communicating relatively reversed motions from said motor to effect a power thrust effort upon said element responsive to actuation of said first switch, the first movement of said motor being then terminated responsive to actuation of said third switch, and current from said battery being directed to said electric motor, with relatively reversed direction of current flow through one of its windings, responsive to restoration of said first switch and precedent actuation of said second switch to retract said element and restore said second switch, current flow from said battery to both said electric motor windings being interrupted by restoration of said second switch and precedent restoration of said first switch.

7. The combination substantially as set forth in claim 6, characterized by the provision of a normally open valve in the conduit leading from said control compressor to said power compressor and said hydraulic motors, and electro-responsive means adapted to be energized by current from said battery responsive to operation of said first switch and of said second switch to effect closing of said valve, and said electro-responsive being subsequently de-energized responsive to restoration of said first switch.

8. The combination substantially as set forth in claim 6, characterized by the provision of a normally open valve in the conduit leading from the exhaust side of said control compressor, means responsive to off-normal movement of said element to close said valve and said valve adapted to be re-opened responsive to retractive movement of said element.

ROY H. ZEILMAN.

REFERENCES CITED

The following references are of record in the file of this patent:

UNITED STATES PATENTS

| Number | Name | Date |
|---|---|---|
| 2,067,491 | Kingsbury | Jan. 12, 1937 |
| 2,260,490 | Stelzer | Oct. 28, 1941 |
| 2,298,051 | Gordon | Oct. 6, 1942 |
| 2,349,310 | Schnell | May 23, 1944 |
| 2,361,419 | Schnell | Oct. 31, 1944 |
| 2,403,870 | Martin | July 9, 1946 |

FOREIGN PATENTS

| Number | Country | Date |
|---|---|---|
| 412,965 | Great Britain | July 6, 1934 |